United States Patent [19]

Fukusaki et al.

[11] Patent Number: 5,035,315
[45] Date of Patent: Jul. 30, 1991

[54] METHOD AND APPARATUS FOR SORTING OBJECTS

[75] Inventors: Hiroaki Fukusaki, Sakai; Masakazu Umehara, Kawachinagano; Hiroyuki Gatayama, Sakai, all of Japan

[73] Assignee: Tenchi Kikai Kabushiki Kaisha, Sakai, Japan

[21] Appl. No.: 332,294

[22] Filed: Mar. 31, 1989

[30] Foreign Application Priority Data

Jan. 13, 1989 [JP] Japan .................................. 1-6590

[51] Int. Cl.⁵ .............................................. B65G 47/26
[52] U.S. Cl. ............................. 198/419.2; 198/419.3; 198/408
[58] Field of Search ................ 198/408, 419.2, 419.3, 198/426, 418

[56] References Cited

U.S. PATENT DOCUMENTS

| | | | |
|---|---|---|---|
| 2,324,930 | 7/1943 | Joa | 198/426 X |
| 3,155,221 | 11/1964 | Griner | 198/419.3 |
| 3,899,069 | 8/1975 | Heinzer | 198/426 |
| 3,902,587 | 9/1975 | Checcucci | 198/419.3 |
| 4,056,200 | 11/1977 | Provost | 198/431 |
| 4,155,441 | 5/1979 | Albrecht et al. | 198/419.2 |
| 4,210,237 | 7/1980 | Gram | 198/419.2 |
| 4,394,899 | 7/1983 | Fluck | 198/408 |
| 4,564,104 | 1/1986 | Anderson | 198/419.3 X |

FOREIGN PATENT DOCUMENTS

| | | | |
|---|---|---|---|
| 3636149 | 4/1988 | Fed. Rep. of Germany | 198/408 |
| 0119621 | 9/1980 | Japan | 198/419.2 |

Primary Examiner—Robert P. Olszewski
Assistant Examiner—James R. Bidwell
Attorney, Agent, or Firm—Lockwood, Alex, FitzGibbon & Cummings

[57] ABSTRACT

A method and apparatus for use in production line of foodstuff and other goods which sorts pieces of goods, such as biscuits, continuously supplied, into groups of a predetermined number of pieces each at predetermined intervals. The transfer speed of pieces on an upstream transport path is set to a predetermined constant speed, and the transport speed of pieces at the sorting section is controlled according to a velocity profile consisting of alternately successive cycles of a low speed zone and a high speed zone. Thus, by utilizing the speed difference between the low speed zone and the high speed zone, groups of a specified number of pieces each are formed on the transport plane of the sorting section, and a predetermined interval is provided between adjacent groups of pieces.

11 Claims, 5 Drawing Sheets

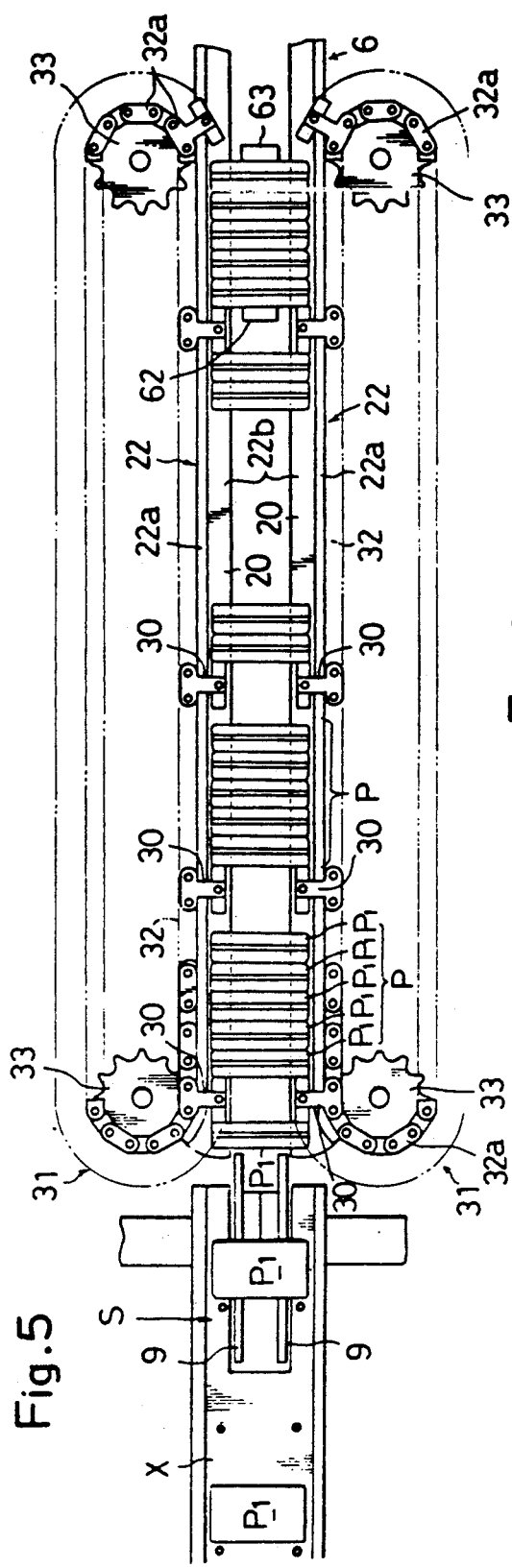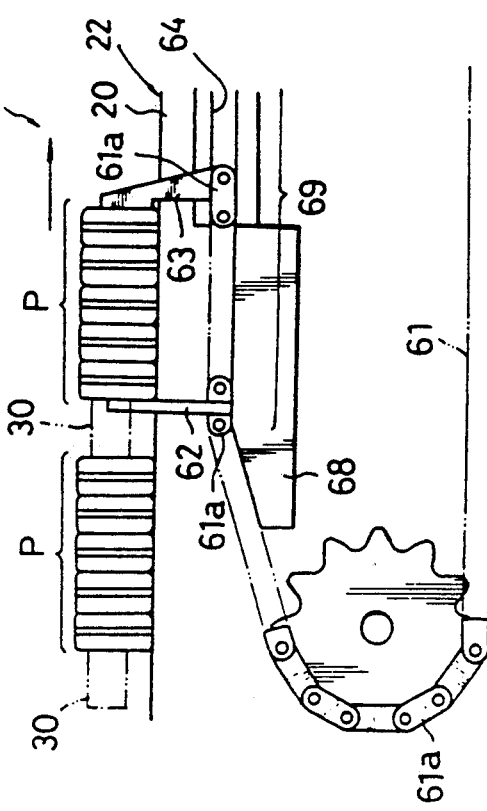

METHOD AND APPARATUS FOR SORTING OBJECTS

BACKGROUND OF THE INVENTION

1. Field of the Invention

The present invention relates to a method and apparatus for sorting objects in a production line for a sweet stuff, a foodstuff, or the like and, more particularly, to a sorting method for sorting, in the stage of packaging in the production line, objects such as, for example, pieces of biscuit, into groups of a predetermined number of pieces each, as they are continuously transported at predetermined intervals.

2. Description of the Prior Art

Hitherto, there have been known sorting apparatus of the type which sorts pieces of biscuit into groups of a specified number of pieces each as they are continuously supplied on a transport mechanism, such as a belt conveyor. A typical arrangement of such apparatus is illustrated, by way of example, in FIGS. 10 and 11.

The sorting apparatus shown has, at the downstream end of an upstream transport path 1, a sorting section provided in continuation therefrom and having a transport plane 20, the sorting section being upwardly inclined toward its downstream end (righthand side in FIG. 10). Below the transport plane 20 there are disposed a pair of chains C, C in parallel relation to each other for movement in parallel with the transport plane 20. On each of the chains C, C there are mounted brackets 39, ... at given intervals, with fixed pins 41 individually mounted to the brackets. Each two corresponding fixed pins of those on the pair of chains C, C, right and left, make a pair and they extend upward from the transport plane 20.

On each of the chains C, C and between each two adjacent fixed pins 41, 41 there are disposed a plurality of up and down movable pins 40, ... in the direction of transport. Similarly to the fixed pins 41, ..., the up and down movable pins 40, ... are arranged in pairs, each pair consisting of two corresponding ones of those disposed on the right and left chains C, C. The up and down movable pins 40 are up and down movably disposed on brackets 39 mounted to the chains C, C and are biased downward by springs 43. The mounting position for each up and down movable pin 40 is set so that the upper end of the pin 40, at its lowered position, is positioned lower than the transport plane 20.

The chains C, C are of such arrangement that they travel along a loop path running between the upstream and downstream ends of the transport plane 20 and that the upper portion of the path of run of the chains C, C is parallel to the transport plane 20.

As FIG. 11 shows, there is provided a guide plate K between the pair of chains C, C. This guide plate K is parallel to the chains C, C over a predetermined distance from a location adjacent the starting point of the upper portion of the path of run of the chains, while on the downstream side thereof the guide plate K is gradually bent or inclined so that it gradually runs away from the upper portion of the path of run of the chains C, C. The lower ends of the up and down movable pins 40, ... are in slide contact with the upper surface of the guide plate K.

In that region of the sorting section in which the guide plate K is positioned adjacent the upper portion of the path of run of the chains C, C, the lower ends of the up and down movable pins 40, 40, ... which run in conjunction with the chains C, C are pushed up by the guide plate K so that the upper ends of the pins 40, 40 ... project upward from the transport plane 20.

As can be seen from FIG. 10, the starting point of the upper portion of the path of run of the chains C, C is positioned at a lower level than and ahead (at righthand side) of the downstream end of the upstream transport path 1.

By setting the speed of transport on the upstream transport path 1 and the run speed of the chains C, C to given timing, therefore, individual pieces $P_1$ ... which are continuously transported on the upstream transport path at given intervals are each caused to drop into the space between an adjacent pair of fixed pins 41, 41 and an adjacent pair of up and down movable pins 40, 40 or into the space between adjacent pairs of up and down movable pins 40, 40 and 40, 40 as they are transferred onto the transport plane 20. Thus, individual pieces $P_1$ are accommodated, one by one, between individual adjacent pairs of pins 40 and 41.

As the chains C, C move downstream, individual pairs of up and down movable pins 40, 40 are sequentially guided at their lower ends by the guide plate K under the biasing force of the springs 43 so that the upper ends of the pins 40, 40 are caused to sink to a level below the transport plane 20. Thereupon, individual pieces $P_1$ which have been supported between pairs of up and down movable pins 40, 40 are each relieved of the support and accordingly they are sequentially allowed to slide by gravity on the transport plane 20 from the downstream side or higher level side toward the upstream side or lower level side fixed pins 41.

Thus, all the pieces $P_1$ ... between adjacent pairs of fixed pins 41, 41 are stacked one over another in the direction of transport by being supported by the upstream side pair of fixed pins 41, 41 whereby they are assembled into one group of pieces P. A given space is defined between the downstream-most (i.e., the rightmost) piece $P_1$ of this group of pieces P and a fixed pin pair 41, 41 downstream of the group. In other words, pieces $P_1$ successively supplied are sequentially sorted into groups of pieces P so that groups of pieces P are successively formed at given intervals on the transport plane 20.

However, sorting apparatuses using such sorting method involve dimensional difficulties as mentioned below, which naturally requires the apparatus to be large in size.

(1) The sorting section for sorting pieces $P_1$ supplied is required to be dimensionally long, which means that the apparatus is of a horizontally long construction. As can be clearly seen from FIG. 10, the interval between adjacent groups of pieces P, P is greater than the sum of diameters of the up and down movable pins 40 ... interposed between two adjacent fixed pins 41, 41. Therefore, where the number of up and down movable pins 40 ... between the pair of fixed pins 41, 41, or the number of pieces $P_1$ which constitutes each group of pieces P, is larger, the interval between the adjacent groups of pieces P is necessarily larger, with the result that a larger sorting section is required.

(2) A sufficient height difference must be provided between the upstream transport path 1 on one hand and the sorting section and a downstream working section continued from the downstream end thereof on the other hand, which necessitates increased size of the apparatus in the heightwise direction thereof.

Since the process of sorting pieces $P_1$ is carried out by moving the individual pieces $P_1$ by gravity toward the upstream side fixed pin 41, the transport plane 20 must have a given degree of angular inclination if such movement is to be smoothly carried out. To this end, sufficient difference of elevation must be provided between the upstream side of the transport plane 20 and the downstream side thereof and also in relation to a transport path and working section continued from the downstream end of the transport plane 20.

BRIEF SUMMARY OF THE INVENTION

The present invention is directed to overcoming the foregoing difficulties with the prior art, and accordingly it is a primary object of the invention to provide a novel method for sorting objects which eliminates aforesaid difficulties and an apparatus for carrying out the method.

It is another object of the invention to provide a sorting method and apparatus for sorting objects which can minimize the length of the sorting section in the production line by uniforming the intervals between individual groups of pieces irrespective of the number of pieces constituting each group of pieces.

It is another object of the invention to provide a sorting method and apparatus for sorting objects which does not require provision of any difference of elevation between the upstream side and the downstream side of the sorting section and thus affords considerable allowance for design of a packaging line inclusive of sorting section and otherwise.

It is a further object of the invention to provide a sorting method and apparatus for sorting objects which permits individual pieces to be sequentially and continuously sorted into groups of pieces by controlling the rate of transfer from the sorting section by a velocity profile consisting of alternately successive cycles of low speed and high speed ranges and yet is simple in construction.

It is a still further object of the invention to provide a sorting method and apparatus for sorting objects which makes it possible to change the number of pieces to be grouped simply by changing the velocity profile for the rate of transfer from the sorting section and which is very useful for various operation purposes.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIG. 4 and 5 are views showing principal portions of a sorting apparatus representing embodiment 2 of the invention, FIG. 4 being a side view, FIG. 5 being a plan view;

FIG. 6 is a side view showing the construction of a downstream transport path continued from the portions shown in FIGS. 4 and 5;

DETAILED DESCRIPTION OF THE PREFERRED EMBODIMENTS

Preferred embodiments of the invention will now be described in detail with reference to the accompanying drawings.

Embodiment 1

Figure 1:
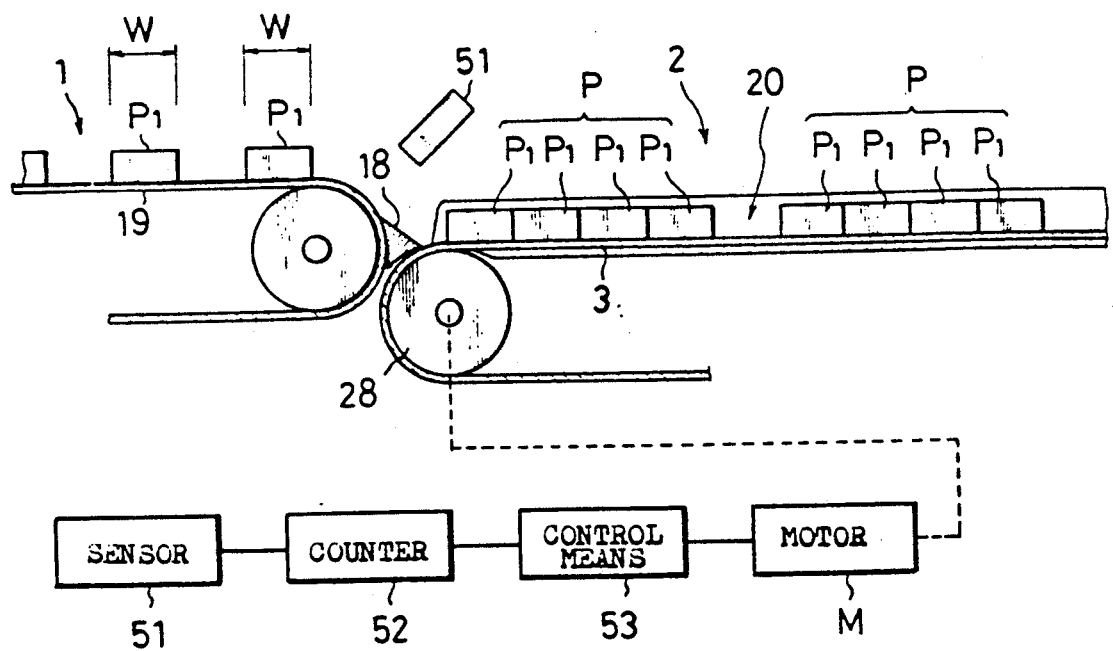
FIG. 1 is a schematic illustration showing a sorting apparatus representing embodiment 1 of the invention.
Figure 2:
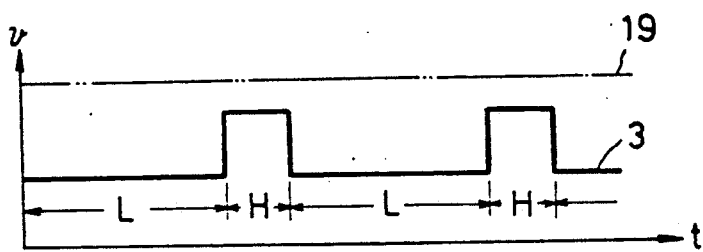
FIG. 2 is a diagrammatic view showing a movement velocity profile of a movable belt of the sorting apparatus.
Figure 3:
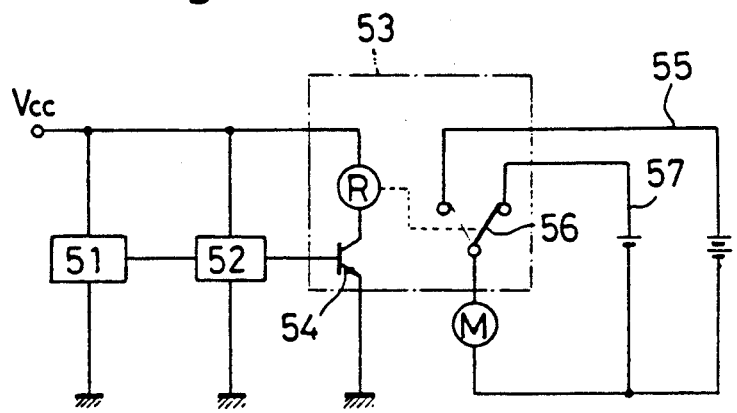
FIG. 3 is a control circuit diagram for control of a motor in the sorting apparatus.

A sorting apparatus representing embodiment 1 of the invention is shown in FIGS. 1 through 3.

The sorting apparatus is of the type in which pieces $P_1$ ... of goods continuously supplied from an upstream transport path 1 are sorted into groups of pieces, each group consisting of a plurality of pieces in stack. In the embodiment shown, the upstream transport path 1 comprises a belt conveyor 19 as a feed means. The run speed of the belt conveyor 19 or the feed rate of pieces is preset so that pieces $P_1$ ... are transported on the belt conveyor 19 at predetermined intervals to a sorting section 2 downstream (righthand side in FIG. 1) of the transport path 1.

The sorting section 2, as the upstream transport path 1 does, has a moving belt 3 as a transport means, the upper surface of the moving belt 3 serving as a transport plane 20. The transport plane 20 is set at a level lower than the upper surface of the belt conveyor 19. The downstream end of the belt conveyor 19 is connected by means of a chute 18 to the upstream end of the moving belt 3, and the upper surface of the chute 18 is in continuation to both the upper surface of the belt conveyor 19 and the transport plane 20. Therefore, pieces $P_1$ ... fed at predetermined timing from the downstream end of the belt conveyor 19 are transmittently transferred onto the upper surface of the moving belt 3 or the transport plane 20 through the chute 18.

In order to ensure that pieces $P_1$ ... intermittently transferred onto the transport plane 20 can be continuously stocked at the upstream end of the moving belt 3, in the present embodiment the moving belt 3 is arranged to run according to such velocity profile as shown in FIG. 2.

In a low speed zone L of the velocity profile, the run speed of the moving belt 3 is set so that the moving belt 3 is driven to run in synchronism with the belt conveyor 19 and at a velocity proportional to but lower than the run speed of the belt conveyor 19. In other words, the run speed of the moving belt 3 in the low speed zone L is set so that from the time when a single piece $P_1$ is fed from the belt conveyor 19 onto the transport plane 20 and until a next piece $P_1$ is fed, the moving belt 3 travels downstream (rightward) a distance corresponding to the width W of one piece $P_1$ as seen in the direction of transport thereof. Accordingly, in the low speed zone L, as FIG. 1 shows, pieces $P_1$ ... fed from the belt conveyor 19 onto the transport plane 20 are stacked up on the transport plane 20 continuously in the downstream direction.

In a high speed zone H of the velocity profile, the run speed of the moving belt 3 is set so that the moving belt 3 is driven to run at such a speed as is necessary to provide a predetermined space between a group of pieces P stacked up as aforesaid and a succeeding piece $P_1$, that is, between adjacent groups of pieces P, P. It is to be noted in this connection that said predetermined space is set in consideration of the configuration and dimensions of the pieces $P_1$ to be sorted, packing operation involved, etc.; in the embodiment shown, as can be seen from FIG. 3, the run speed of the moving belt 3 is set at a level slightly lower than that of the belt conveyor 19, so that the distance between adjacent groups of pieces P, P is slightly smaller than the width of each piece $P_1$ as seen in the direction of transport.

In order to achieve the velocity profile shown in FIG. 2 with the moving belt 3 which is speed variable, in this embodiment, a servo motor M, as shown in FIGS. 1 and 3, is employed as a drive power source for a driving pulley 28 which drives the moving belt 3. This servo motor is so arranged that it runs normally at a speed corresponding to the low speed zone L and is temporarily controlled to run at higher speed, whereby the FIG. 2 velocity profile can be achieved.

It is arranged that the high speed zone H is maintained for a given period of time according to a predetermined timing. For this purpose, in the present embodiment a sensor 51 is disposed in opposed relation to the chute 18 and there are also provided a counter 52 for counting the number of output times of the sensor 51 and a control means 53 for controlling the servo motor M according to the output of the counter 52.

The sensor 51 detects the passage of each piece $P_1$ and outputs a certain signal when the piece $P_1$ has passed the chute 18.

The counter 52 counts the number of output times of the sensor 51 and outputs a certain output signal each time when the number of the sensor output times reaches a preset value; and it resets count value when the number of outputs from the sensor 51 has reached the preset value.

The control means 53 operates in such a manner that it normally supplies to the servo motor M a constant level of current or voltage corresponding to the low speed zone and, when a signal is received from the counter 52, it supplies a current or voltage level of power which corresponds to the high speed zone H. That is, where rotation speed control of the servo motor M is carried out by voltage control, high voltage is supplied to the servo motor M for a given period of time, while where rotation speed control is carried out by current control, large current is supplied to the servo motor M for a given period of time. In the present embodiment, when the count value of the counter 52 has reached "4", the run speed of the moving belt 29 is changed from the low speed zone L to the high speed zone H.

For the relative arrangement of the sensor 51, counter 52, and control means 53, where rotation speed control of the servo motor M is carried out by voltage control, for example, such arrangement as shown in FIG. 3 may be employed.

In the FIG. 3 arrangement, a switching transistor 54 which conducts under an output from the counter 52 which receives outputs from the sensor 51, and a relay R connected in series to the transistor 54 are employed in combination, the output contacts of the relay R being used as switching contacts 56.

Therefore, when the relay R conducts, the switching contacts 56 are connected to a high voltage circuit 55, whereby high voltage is supplied to the servo motor M connected in series to the switching contacts 56 so that the servo motor M goes into high speed run. Conversely, when the relay R is in the nonconducting state, the switching contacts 56 are connected to a low voltage circuit 57 so that the servo motor M goes into low speed run. In this way, aforesaid velocity profile can be achieved with the moving belt 3.

Nextly, operation of the above described sorting apparatus of embodiment 1 will be explained.

I) As pieces $P_1$ . . . are supplied intermittently and continuously from the belt conveyor 19 of the upstream transport path 1 onto the transport plane 20 of the moving belt 3, the pieces $P_1$ . . . are individually detected by the sensor 51 and the number of detections so made is counted by the counter 52. Meanwhile, the moving belt 3 is controlled to run at the normal run speed (which corresponds to the low speed zone L) until the count value at the counter 52 reaches the preset value "4".

Therefore, pieces $P_1$ . . . supplied onto the moving belt 3 are held on the transport plane 20 in such condition as shown in FIG. 1 (stock condition) in which they are continuously stacked in the downstream direction, until the count value at the counter 52 reaches the preset value "4".

II) When the count value at the counter 52 has reached the preset value "4", power supply from the control means 53 to the servo motor M steps up to a value corresponding to the high speed zone H for the moving belt 3 and accordingly the servo motor M goes into high speed run. The high speed run of the servo motor M is maintained for a predetermined period of time, by a controller, such as a timer, of the control means 53.

Then, the pieces $P_1$ . . . which have been held in stock condition on the transport plane 20 of the moving belt 3, that is, a group of pieces, are integrally and temporarily transported downstream by the moving belt 3 at high speed.

III) When, after the predetermined time, power supply from the control means 53 is reset to normal condition, the servo motor M resets to its low speed run condition and accordingly the run speed of the moving belt 3 or transport rate of pieces resets to the low speed zone condition for a next cycle of operation I) above.

As the moving belt 3 returns to its operation pattern in I) above, a next piece $P_1$ is supplied, in succession to the preceding group of pieces P, onto the transport plane 20 of the moving belt 3. In this case, between the next piece $P_1$ and a preceding piece $P_1$, or the last piece $P_1$ of the preceding group of pieces P, there is created an interval corresponding to the high speed zone H.

Therefore, through repetition of such series of operation as described in I) to III) above, pieces $P_1$ . . . supplied intermittently and continuously onto the transport plane 20 are, as FIG. 1 shows, continuously sorted into groups of pieces P, each group consisting of four pieces $P_1$ . . . , and transported downstream.

In the apparatus of this embodiment 1, the number of pieces $P_1$ . . . transferred onto the transport plane 20 is directly counted and, on the basis of the output from the sensor 51 and the counter 52 according to the counted number, the run speed of the moving belt 3 is changed over from the low speed zone L to the high speed zone H. However, if the run speed of the belt conveyor 19 and that of the moving belt 3 in the low speed zone L can be accurately maintained constant, it may be arranged that the timing for start of the high speed zone and end thereof is controlled only by time, because the time required in counting the number of pieces $P_1 \ldots$ as constituents of each group of pieces is in agreement with the time requirement of the low speed zone L.

Embodiment 2

A sorting apparatus representing Embodiment 2 is illustrated in FIGS. 4 through 9, inclusive. The sorting apparatus is particularly intended for use in sorting biscuits.

In this sorting apparatus, an upstream transport path 1 comprises a first transport path X and a moving belt 10.

The upstream transport path 1 is so arranged that the first transport path X longitudinally extends in the direction of transport and the moving belt 10 is installed above the first transport path X for movement in parallel therewith. A plurality of transfer levers 11 projects from the moving belt 10. The transfer levers 11 . . . are movable in conjunction with the moving belt 10, and pieces or biscuits $P_1$ are transferred as laid flat by these levers 11 at predetermined intervals toward a sorting section 2 located downstream.

Figure 4:
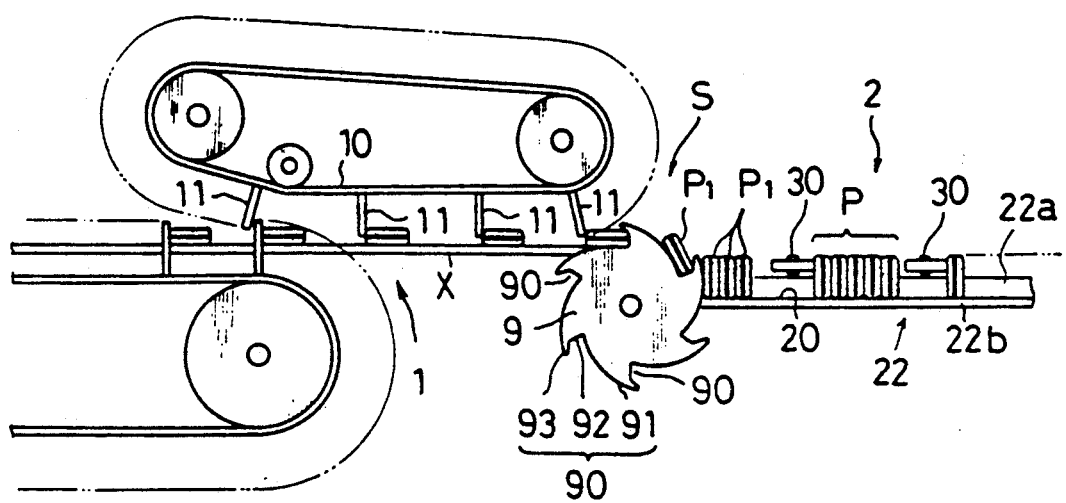
Figure 7:
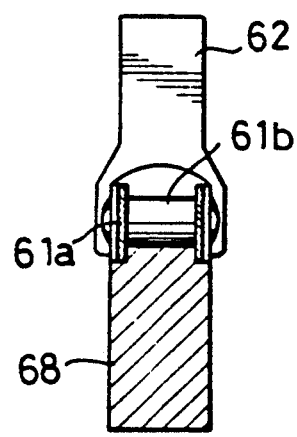
FIG. 7 is a front view, partly in section, showing the construction of a second chain relative to a fixed arm in the downstream transport path.

As FIGS. 4 and 5 show, the sorting section 2 is disposed downstream of and in continuation to the downstream end of the upstream transport path 1 and comprises a stocking device S, a pair of guide rails 22, 22 defining the transport plane 20, and a pair of travel members 31, 31.

The stocking device S, as FIG. 4 shows, has a pair of cams 9, 9, right and left, having a windmill shape. The stocking device S operates to load biscuits $P_1$ onto the transport plane 20 at the upstream end thereof while repositioning them upright as they are transported to the stocking device S in flat laid condition by transport levers 11 . . . of the moving belt 10, so that they are stocked on the transport plane 20 at the upstream end thereof in continuous alignment extending in the downstream direction.

For this purpose, the cams 9, 9 are formed on the outer circumferential edge thereof with a plurality of transfer notches 90 . . . (6 in number in the embodiment shown). As FIG. 4 shows, each of the notches 90 consists of three portions, namely, an arcuate portion 91, a linear portion 92, and a projection 93.

The arcuate portion 91 has a cam function for urging each biscuit $P_1$ in the direction of transport. This arcuate portion 91 has an arcuate contour inclined in the circumferential direction of the cam 9 and extends radially outwardly from the radially innermost end of the linear portion 92 in an expansive pattern in the counter-rotation direction (counterclockwise), its radially outer end being continued to the projection 93, thus forming an outermost peripheral edge of the cam 9. The linear portion 92 has a straight-line contour extending radially of the cam 9, its radial width being set slightly larger than the thickness of the biscuit $P_1$.

The rotation speed of the cams 9, 9 is set so that it is synchronized with the run speed of the moving belt 10. In other words, the rotation of the cams 9, 9 is controlled so that one of the notches 90 . . . reaches and is positioned at the downstream end of the moving belt 10 when a biscuit $P_1$ is transferred to the downstream end of the belt 10.

As FIG. 5 shows, the pair of guide rails 22, 22, right and left, are laid downstream of the cams 9, 9 and in parallel therewith at outer sides, right and left, thereof. Each of the guide rails 22 has a sectional configuration of L shape having an upright portion 22a and a horizontal portion 22b. The distance between the respective upright portions 22a, 22a of the guide rails 22, 22, as FIG. 5 shows, is set slightly greater than the lateral width of biscuits $P_1$.

The respective upper surfaces of horizontal portions 22b, 22b of the guide rails 22, 22 are horizontally even with each other to form the transport plane 20. The transport plane 20, as FIG. 4 shows, is positioned at a level lower than the upper surface of the first transport path X.

At outer sides, right and left, of the guide rails 22, 22, as FIG. 5 shows, the travel members 31, 31 are disposed in parallel relation. The travel members 31, 31 are designed to sequentially sort biscuits $P_1$ stocked on the transport plane 20 by the stocking device S into groups of biscuits, each of a predetermined number of biscuits. Each travel member 31 comprises a first chain 32 of a loop shape installed in parallel relation to one of the guide rails 22, the first chain 32 having a plurality of transfer pawls 30 . . . mounted thereto at predetermined intervals over its entire length.

Transfer pawls 30 are individually mounted to chain links 32a positioned at given intervals (i.e., at an interval of several links) of those consisting of the first chain 32. The distance between each two adjacent transfer pawls 30, 30 in each first chain 32 is set in consideration of the length of each group of biscuits P as seen in the direction of transport. In the instance shown, the distance is set slightly greater than the length of five biscuits $P_1$ stacked together in the direction of transport. The transfer pawls 30 are arranged so that on the outward moving side (inner side in FIG. 5) of the first chain 32 they project inwardly beyond the upright portion 22a of the guide rail 22 and so that each two corresponding transfer pawls 30, 30 of the first chains 32, 32, right and left, make a pair.

The elevation of the path of movement of the first chains 32, 32 is set in consideration of its relationship with the guide rails 22, 22 and with biscuits $P_1$ . . . transported along the guide rails 22, 22. That is, it is arranged that as transfer pawls 30, 30 project inwardly of and above the guide rails 22, each pair of transfer pawls 30, 30, right and left, go into abutment at their front ends against upper rear surface of an adjacent biscuit $P_1$ at opposite ends thereof, as can be seen from FIG. 4.

Each first chain 32 is trained around sprockets 33, 33 which are respectively positioned adjacent upstream and downstream ends of the guide rails 22, 22 and at outer sides, right and left, of thereof. At the site of the upstream side sprocket 33, transfer pawls 30 . . . of each first chain 32 are allowed to have an access inward of the guide rail 22 from outer side thereof, the position of such inward access being in agreement with the downstream end of the cam 9.

The first chains 32, 32 are driven by a single drive means associated with the sprockets 33, 33 so that they run in synchronism with each other. In the present embodiment, a variable speed motor (not shown) is employed as such drive means.

As is the case with the foregoing embodiment 1, the run speed of the first chains 32, 32, or the travel members 31, 31, consists of high speed zone H and low speed zone L as represented by the FIG. 2 velocity profile so that each time the number of biscuits $P_1$ . . . stocked by the stocking device S reaches a predetermined number (5 in the present embodiment), the first chains 32, 32 go into the high speed zone H. In the embodiment shown, the run speed of the first chains 32 is set so that within the time required in stocking five pieces of biscuit $P_1$ .. . (time for formation of a group of biscuits P) transfer pawl 30 moves substantially the same distance as the width of the group of biscuits P as seen in the direction of transport. Counting of biscuits P ... may be carried out by, for example, detecting the rotational angle of the cam 9, or as in Embodiment 1, the number of biscuits $P_1$ may be counted directly.

It is needless to say that in this embodiment 2, the arrangement of the preceding embodiment 1, including the movement velocity profile and controls shown in FIGS. 1-3, may be employed as it is for the purpose of controlling the variable speed motor which drives the travel members 31, 31.

In the embodiment shown, a pair of travel members 31, 31 are provided; but alternatively the number of travel members 31 may be one instead of two. In such case, the travel member 31 may be installed either above or below the transport plane 20 and it may be arranged that at the outward moving side of the travel member, transfer pawls 30 ... project into the transport zone above the transport plane 20.

A downstream transport path 6 is provided downstream of the sorting section 2 in continuation thereto. The downstream transport path 6 is intended for transporting further downstream groups of biscuits P ... sorted in the sorting section and is of such construction as shown in FIG. 6.

The downstream transport path 6 comprises extensions of the guide rails 22, 22 from the sorting section 2, and a second chain 61 which runs in a loop pattern. The second chain 61 has a plurality of fixed arms 62 ... and a plurality of pivotal arms 63 ... which are mounted thereto. The distance at which each fixed arm 62 and each pivotal arm are mounted is in agreement with the length of each group of biscuits P as seen in the direction of transport. Further, it is arranged that the fixed arms 62 and pivotal arms 63 project above the transport plane 20 of the sorting section 2 at the downstream end of the transport plane 20.

In order to achieve smooth operation of transport means associated with the downstream transport path 6, it is arranged that, as FIG. 6 shows, the second chain 61 moves upward along an inclined guide 68 at the downstream end of the transport plane 20 of each of the guide rails 22, 22 and thereafter it goes into horizontal movement. Each of the fixed arms 62 is directly fixed to a chain link 61a of the second chain 61 and it projects perpendicularly to the chain link 61a.

Figure 8:
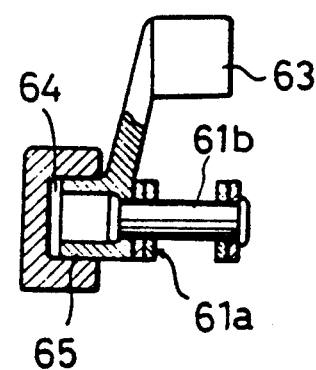
FIGS. 8 and 9 are views illustrating the construction of the second chain relative to a pivotal arm and a guide groove in the sorting apparatus, FIG. 8 being a front view, partly in section, FIG. 9 being a side view, partly in section.

Each of the pivotal arms 63, as FIG. 8 shows, is pivotally supported on a pin 61b of the chain link 61a at a location spaced a given distance from the fixed arm 62 downstream thereof. The pivotal arm 63 corresponds to a guide groove 64 provided downstream from the upstream end of a horizontal travel zone 69 for the second chain 61.

As FIG. 8 shows, the guide groove 64 has a generally U-shaped sectional profile open toward the second chain 61. A projection 65 extending generally perpendicularly from a pivot point of the pivotal arm 63 is positioned opposite the guide groove 64.

Figure 9:
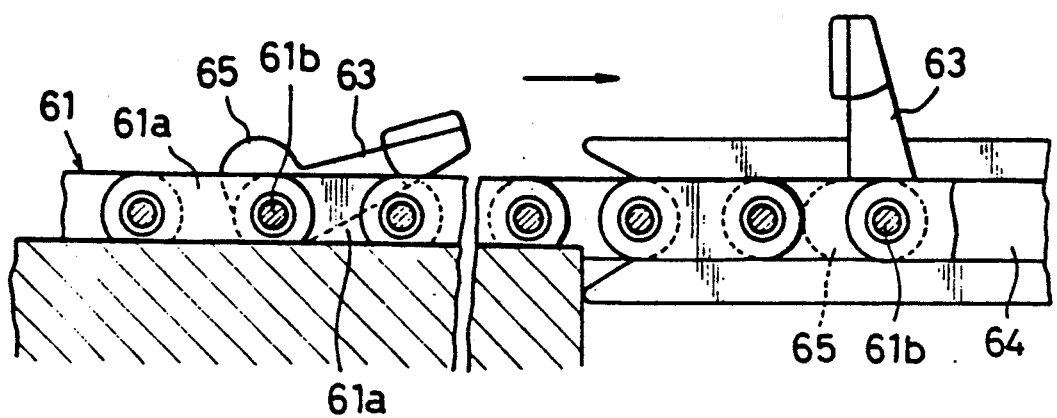
Figure 10:
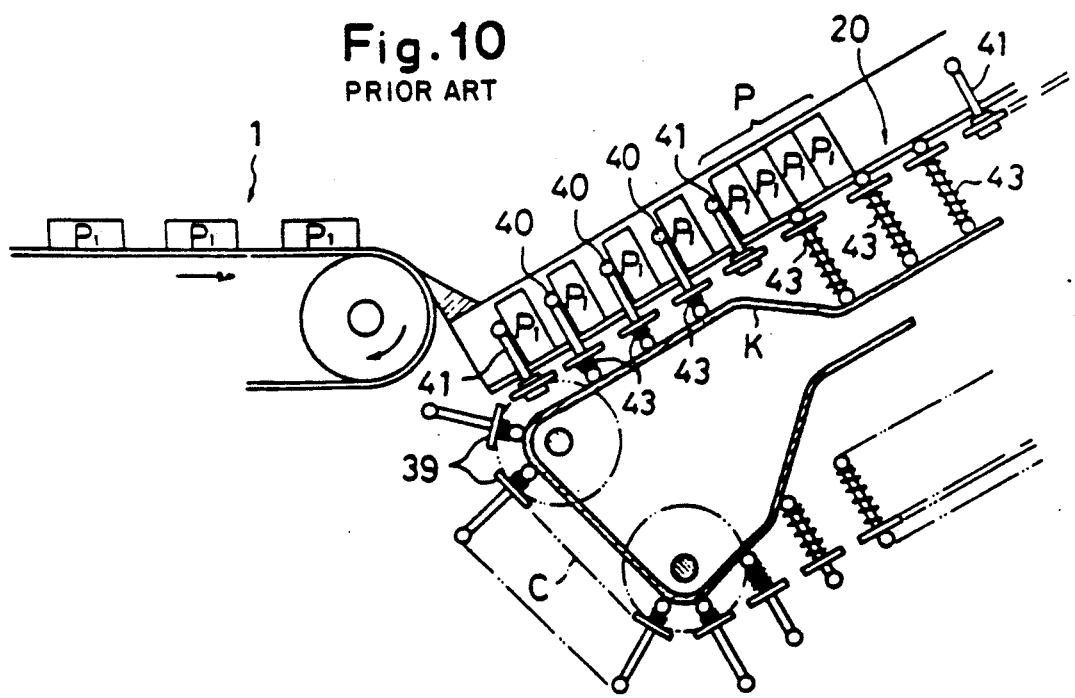
FIGS. 10 and 11 are views showing a portion of a conventional sorting apparatus, FIG. 10 being a side view, FIG. 11 being a front view, partly in section.
Figure 11:
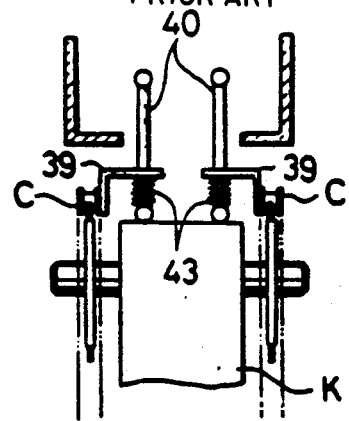

In the downstream transport path 6 of the above described arrangement, as FIG. 5 shows, the fixed arms 62 and pivotal arms 63 extend through the downstream transport path 6 to run over the space defined between the pair of extended guide rails 22, 22, right and left. Along with the movement of the second chain 61 which moves upward from the downstream end of the transport plane 20 and along the inclined guide 68, the fixed arm 62 goes into abutment with the rear end of a sorted group of biscuits P; and simultaneously therewith, projection 65 of a preceding pivotal arm 63 at the downstream side enters the guide groove 64 as FIG. 9 shows, whereby the pivotal arm 63 which has been held lying is pivoted to rise up as shown, thus going into abutment against the front end of the group of biscuits P. Accordingly, the group of biscuits P is held between the fixed arm 62 and the pivotal arm 63 as FIG. 6 shows, and as the second chain 61 moves, it is transported downstream while being so held between the two arms 62 and 63.

Nextly, the manner of operation of the above described sorting apparatus of embodiment 2 will be explained.

A. Stocking Device S (1) As biscuits $P_1$ ... are transported by transfer lever 11 of the moving belt 10 to the upstream end of the sorting section 2, they are each fed into a pair of notches 90, 90 of the cams 9, 9 located at the downstream end of the first transport path X. When each biscuit $P_1$ approaches a point at which it is brought to its upright position through rotary movement of the cams 9, 9, the biscuit $P_1$ goes into abutment with the transport plane 20. As the cams 9, 9 rotate further, the biscuit $P_1$ is pushed under the cam action of the arcuate portions 91, 91 of the cams 9, 9 so that it is allowed to slide a predetermined distance on the transport plane 20 in the direction of transport.

The distance by which the biscuit is pushed coincides with the angular inclination of the arcuate contour of the arcuate portion 91, or in other words, it coincides with the radial distance between the radial inner end of the arcuate portion 91 and the radial outer end thereof. This distance is set slightly greater than the thickness of one piece of biscuit.

Through the above described operation the biscuit $P_1$ is transferred onto the transport plane 20 while being held upright.

(2) When the transfer of the biscuit $P_1$ onto the transport plane 20 is completed, a succeeding biscuit $P_1$ coincides, at the downstream end of the first transport path X, with notches 90, 90 next to the preceding notches, and the succeeding biscuit $P_1$, in turn, is transferred onto the transport plane 20 in same manner as above mentioned.

(3) Thus, biscuits $P_1$ ..., as they move forward on the first transport path X, are sequentially stocked on the transport plane 20 in upright and stacked condition.

B. Travel Members 31, 31

(1) While the number of biscuits stocked by the stocking device S is smaller than 5, the run speed of the travel members 31, 31 is in normal speed zone, that is, the low speed zone L.

(2) When the number of biscuits $P_1$ stocked by the stocking device S reaches 5, the variable speed motor (not shown) as the drive means for the travel members 31, 31 goes into high speed run and accordingly the run speed of the travel members 31, 31 is changed from the low speed zone L to the high speed zone H. The high speed zone H is maintained for the predetermined period of time.

Then, a pair of transfer pawls 30, 30, right and left, of the travel members 31, 31 makes an entry into a region above the transport plane 20 from outside the cams 9, 9, whereupon the group of biscuits P which has been held in stock is integrally and temporarily transported downstream at high speed along the transport plane 20.

(3) After the predetermined period of time, the run speed of the travel members 31, 31 resets to the low speed zone L for repetition of operation in (1) above.

Subsequently, succeeding biscuits $P_1$ ... are supplied onto the transport plane 20 by the stocking device S at the predetermined speed, and a predetermined distance is created between the succeeding biscuits $P_1$ and the rearmost biscuit $P_1$ of the group of biscuits P already transferred by the transfer pawls 30, 30.

Therefore, through the repetition of the operation of the stocking device S and the series of operation of the associated travel members 31, 31, biscuits $P_1$ ... supplied onto the transport plane 20 by the stocking device S are, as FIGS. 4 and 5 show, continuously sorted into groups of 5 biscuits each and then transported further downstream to a downstream transport path 6.

In either case of the embodiment 1 or 2, for the drive motor which drives the moving belt 29 or the travel members 31, it is possible to use a servo motor or pulse motor, as well as a general-purpose motor. It is only necessary that these motors are speed variable for the purpose of changing the run speed of the moving belt 29 or travel member 31 from the low speed zone L to the high speed zone H and vise versa, and that they can be driven at constant speed at least in the low speed zone.

Where a servo motor is employed, since its drive unit usually incorporates a changeover means for switching from high speed run to low speed run and visa versa, it is possible that the output of the counter 52 in the foregoing embodiments is inputted to the changeover means.

As described in detail above, according to the present invention, the transport speed of pieces on the upstream transport path is set at a predetermined speed, and the transport speed of pieces in the sorting section is controlled according to a velocity profile consisting of alternately continued low speed and high speed cycles. Thus, by utilizing the speed difference between the low speed zone and the high speed zone, groups of a predetermined number of pieces each are trained on the transport plane of the sorting section and, at the same time, a predetermined distance is created between groups of pieces. Therefore, the invention provides various advantages as enumerated below.

(1) By uniforming the distance between groups of pieces irrespective of the number of component pieces of each group it is possible to minimize the length of the sorting section in the production line.

(2) It is not necessary to provide any difference in elevation between the upstream and downstream sides of the sorting section; and accordingly considerable allowance can be provided in connection with designing the packaging line including the sorting section and otherwise.

(3) The transport speed in the sorting section is controlled by utilizing the difference in speed between the low speed zone and the high speed zone. Therefore, the invention provides simplified construction, the advantage of less trouble and longer service life, and ease of maintenance.

(4) The number of pieces per group can be changed simply by changing the velocity profile of transport operation in the sorting section. Therefore, the invention is applicable to a wide range of operation areas.

It is to be understood that the embodiments described hereinabove are intended to clarify the technical aspects of the invention; therefore, the invention should not be constructed in any narrow way, nor is it to be limited to the above described embodiments, but rather it should be broadly constructed that various changes and modifications may be made without departing from the spirit and scope of the appended claims of the invention.

What is claimed is:

1. A method of sorting, at a sorting section continued from an upstream transport path, pieces of goods continuously supplied from the upstream transport path into groups of pieces, each group consisting of a plurality of pieces, which comprises:

setting the transport speed of pieces on the upstream transport path at a predetermined speed, and supplying for sorting said pieces sequentially onto a transport plane of the sorting section at predetermined intervals, counting by counting means the number of pieces supplied onto the transport plane, controlling the transport speed of pieces between low and high speeds in the sorting section on the basis of the result of the counting and according to a velocity profile comprising alternately successive cycles of the low and high speeds.

controlling the transport speed of pieces in the sorting section at the low speed until the counting of pieces reaches a predetermined value, and when the counting of pieces reaches the predetermined value, controlling the transport speed of pieces in the sorting section at the high speed for a given period of time, and utilizing the speed difference between the low speed and the high speed to form on the transport plane groups of pieces, each corresponding in number to the predetermined value, and to provide a predetermined interval between said groups of pieces.

2. A method of sorting pieces of goods as set forth in claim 1 wherein:

the transport speed of pieces in the sorting section in the low speed is lower than the transport speed of pieces on the upstream transport path; and the speed difference between the transport speed of pieces in the sorting section at low speed and the transport speed of pieces on the upstream transport path is utilized to form on the transport plane groups of pieces, each corresponding in number to the predetermined value, and the speed difference between the transport speed of pieces in the sorting section at the low speed and that at the high speed is utilized to provide a distance of a predetermined value between said groups of pieces.

3. An apparatus for sorting, at a sorting section continued from the downstream end of an upstream transport path, pieces of goods continuously supplied from the upstream transport path into groups of pieces, each group consisting of a plurality of pieces, which comprises:

said upstream transport path having supply means for continuously supplying said pieces to be sorted to said sorting section at a predetermined transfer speed and at predetermined intervals, said sorting section being provided in continuation to the downstream end of said upstream transport path, said sorting section including transfer means having a transport plane for receiving said pieces and transporting same downstream, counting means for counting the number of pieces supplied onto the transport plane of said transfer means, control means for controlling the speed of transport of pieces by said transfer means on the basis of the result of said counting and according to a velocity profile comprising alternately successive cycles of low and high speeds, said control means being adapted to control the speed of transport of pieces by said transfer means to a low speed which is lower than the transfer speed of pieces on the upstream transport path until the counting of pieces by the counting means reaches a predetermined value, and to control the transport speed of pieces in the sorting section to a high speed which is faster than said low speed for a given period of time when said counting of pieces has reached the predetermined value to form groups of pieces on the transport plane by utilizing the speed difference between the low and high speeds, each group corresponding in number to the predetermined value, and to provide a predetermined interval between said groups of pieces.

4. A sorting apparatus as set forth in claim 3 wherein:
the supply means on the upstream transport path is a belt conveyor for continuously supplying said pieces to be sorted at a predetermined transport speed and at predetermined intervals;
the transfer means at said sorting section is a moving belt adapted to run at a transfer speed of pieces in accordance with said velocity profile having said low and high speeds, the upper surface of said moving belt being used as said transport plane.

5. A sorting apparatus as set forth in claim 3 wherein:
said counting means is disposed between the downstream end of the upstream transport path and the upstream end of the sorting section, said counting means comprising a sensor means for detecting the passage of each of said pieces, and a counter means for counting output signals from the sensor means,
said control means is adapted to control, according to the output signal from the counter means, a drive motor for the transfer means of the sorting section in accordance with a velocity profile having alternately successive cycles of low and high speeds.

6. A sorting apparatus as set forth in claim 4 wherein:
the transfer plane of said moving belt is disposed at a level lower than the upper surface of said belt conveyor, and
the downstream end of said belt conveyor and the upstream end of said moving belt are connected to each other by a chute having an upper surface continued to both the upper surface of said belt conveyor and the transfer plane of said moving belt.

7. An apparatus for sorting, at a sorting section continued from the downstream end of an upstream transport path, pieces of goods continuously supplied from the upstream transport path into groups of pieces, each group consisting of a plurality of pieces, which comprises:
said upstream transport path having supply means for continuously supplying said pieces to be sorted to said sorting section at a predetermined transfer speed and at predetermined intervals,
said sorting section being provided in continuation to the downstream end of said upstream transport path, said sorting section including stocking means for receiving said pieces and stocking same on a stationary transfer plane, and transfer means for transporting stocked groups of pieces downstream, counting control means for counting the number of pieces stocked by said stocking means and for controlling, according to the result of the counting, the speed of transfer of pieces by said transfer means in accordance with a velocity profile comprising alternately successive cycles of a low speed and a high speed, said counting control means being adapted to control the run speed of said transfer means to a low speed corresponding to the piece stocking speed of said stocking means until the number of pieces stocked reaches a predetermined number, and to control the run speed of said transfer means to a high speed which is faster than said low speed for a given period of time when the number of pieces stocked has reached the predetermined number to form groups of pieces on the transport plane by utilizing the speed difference between the low and high speeds, each group corresponding in number to the predetermined number, and to provide a predetermined interval between said groups of pieces.

8. A sorting apparatus as set forth in claim 7 wherein:
said supply means on said upstream transport path is a moving belt provided with a plurality of transfer levers for stocking said pieces to be sorted and adapted to run at a predetermined constant speed, said transfer levers being disposed at predetermined intervals.

9. A sorting apparatus as set forth in claim 7 wherein:
said stocking means of said sorting section has a cam member controlled for its rotation in synchronism with the piece transfer speed of said supply means,
said cam member is provided on its outer periphery with a plurality of transfer notches having a cam, at predetermined intervals, and
said transfer notches are each adapted to receive a piece supplied from the supply means as the cam member rotates and load same onto said transfer plane and to transport the piece a predetermined distance in the direction of transport under the biasing action of the cam.

10. A sorting apparatus as set forth in claim 7 wherein:
said transfer means of said sorting section is a travel member which extends and runs in parallel with said stationary transfer plane,
said travel member comprises a loop-shaped endless chain and a plurality of transfer pawls disposed at predetermined intervals over its entire length,
said transfer pawls project into a piece transfer region of the transfer plane at the outward moving side of said endless chain, and
the distance between adjacent transfer pawls is set slightly larger than the width of each piece stocked by the stocking means as seen in the direction of transport.

11. A sorting apparatus as set forth in claim 10 wherein:
the piece transfer speed of the transfer means in the low speed is set in such a way that said transfer pawls each move a distance of about same order as the width of each piece as seen in the direction of transport, during a period of time in which a group of pieces is formed.

* * * * *